Figure 1:
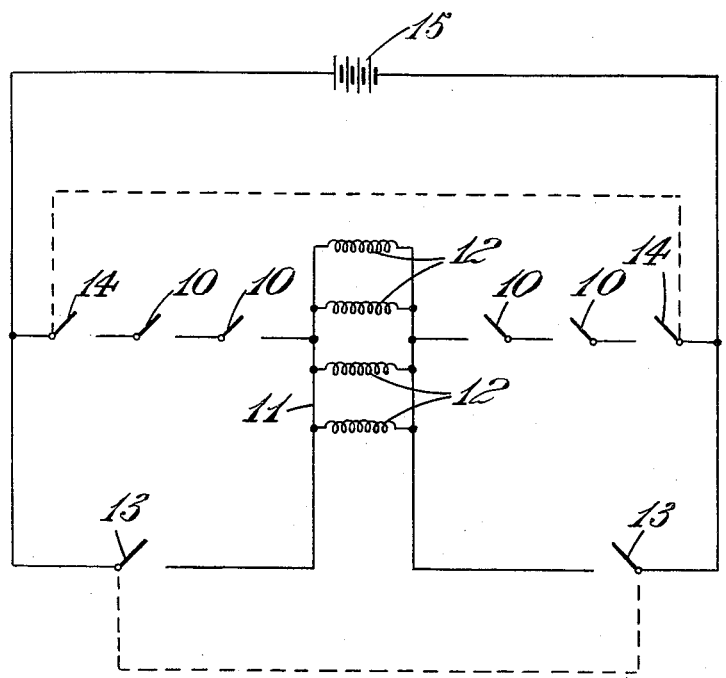

United States Patent Office 2,994,385
Patented Aug. 1, 1961

2,994,385
CONTROL SYSTEMS FOR AIRCRAFT PROPELLERS
Alfred Dennis Jackson, Derby, England, assignor to Rotol Limited, Gloucester, England, a British company
Filed Oct. 28, 1957, Ser. No. 692,740
Claims priority, application Great Britain Nov. 1, 1956
7 Claims. (Cl. 170—135.24)

This invention relates to control systems for aircraft propellers.

According to the present invention, in a multi-engine aircraft having gas-turbine propeller engines, the propellers each including a constant speed unit and a pitch stop which is operative in flight and prevents the propeller fining off to a pitch such that excessive windmilling speeds occur in the event of failure of the constant speed unit of the propeller, there is provided a control system for the propellers comprising a plurality of sensing means, one for each propeller, for indicating when the propeller has fined off to the pitch determined by its said pitch stop, and control means for rendering said pitch stops inoperative, said control means being operatively connected with said sensing means to operate to render the said pitch stops of all the propellers inoperative when each of the propellers has fined off to the pitch determined by its pitch stop.

In high-speed aircraft, it is desirable not only to have a pitch stop to prevent excessive fining off of a propeller in event of failure of its constant speed unit, but also to provide means whereby all the stops can be rendered inoperative automatically when, say, the aircraft is preparing to land. A control system according to the invention achieves this purpose.

The said pitch stops may be flight cruise stops set for instance to prevent fining off of a propeller to less than about 35°, and a particular application of the invention is to aircraft designed to fly at high speed where the said pitch stops are additional to the conventional flight fine pitch stops which limit the normal flight pitch change range of the propeller, the flight fine pitch stops being set to prevent fining off of a propeller to less than say 22°. It will be appreciated that with high flight speed the fining off of the propeller in the event of failure of a constant speed unit to the flight fine pitch stop may cause excessive windmilling speed. Accordingly the said pitch stops are provided, it being desirable to render the said stops inoperative in preparing to land, pitch fining movement of the propellers then being limited only by the flight fine pitch stops.

According to a preferred arrangement of this invention, the sensing means for each propeller comprises an electrical propeller-switch, and means operatively connected with the propeller for operating the propeller-switch, said propeller-switch being closed only when the propeller is at and below the pitch determined by its said pitch stop, and said control means comprises electromagnetic means energisable to initiate operation of said control means to render said stops inoperative, and said propeller-switches are connected in series with one another and with said electro-magnetic means. Thus unless and until all the propellers have fined off to the pitch determined by the said pitch stops and all the propeller-switches are closed, the electro-magnetic means cannot be energised and the stops will not automatically be rendered inoperative. Preferably, moreover, manual switch means is provided to override the automatic means to permit energisation of the electro-magnetic means at will. Also manually operable switch means may be provided to render the propeller switches inoperative to energise the electro-magnetic means.

Figure 2:
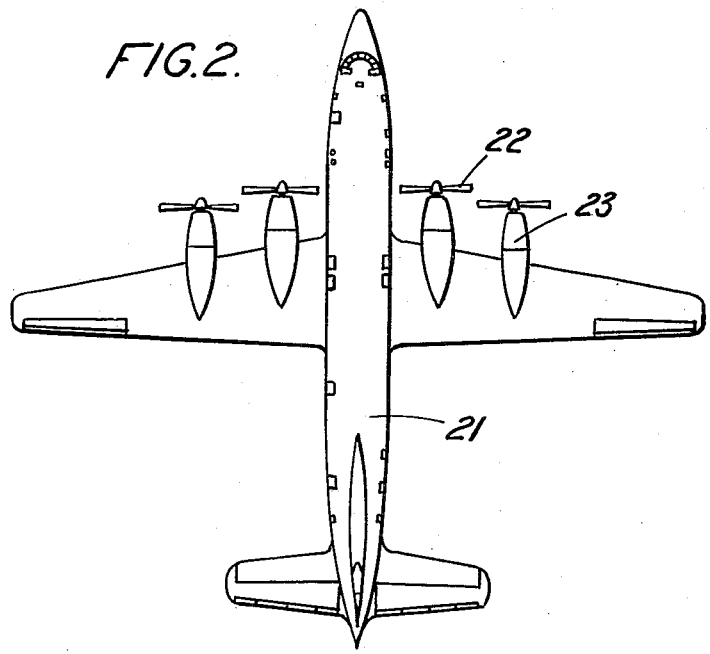
Figure 3:
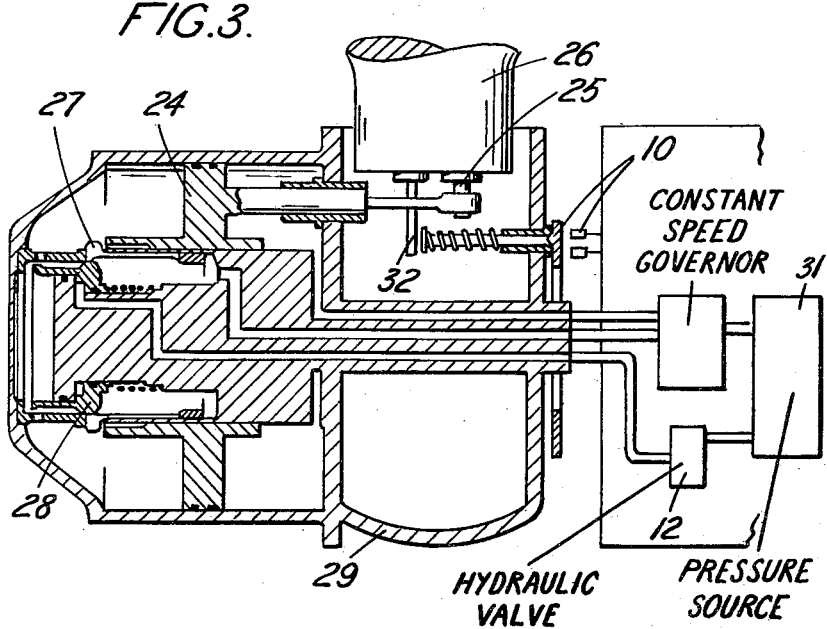

One embodiment of the invention will now be described with reference to the drawings in which:

FIGURE 1 shows the electric circuit of a control system according to the invention for the porpellers of a four engine gas turbine propeller driven aircraft;
FIGURE 2 shows such an aircraft, and
FIGURE 3 is an enlarged sectional view of the propellers of the aircraft.

Each propeller has a flight cruise stop set at 35° and a flight fine pitch stop set at 22° (not shown). The control system about to be described is for the automatic breakdown of the flight cruise stops.

An aircraft 21 has four variable pitch propellers 22 driven by gas turbine engines 23. The pitch of the propellers 22 is changed by movement of a ram 24 of a hydraulic pitch change motor connected to roots 25 of the blades 26 of the propellers 22. The flight cruise stop means 27 in their operative position, are held in the path of movement of the ram 24 to limit movement thereof in the pitch fining direction. Retaining means in the form of a ram 28 hold the stop means 27 in their operative position and is displaceable to render the stop means 27 inoperative, i.e., to break down the stop means. The retaining means 28 is displaceable by hydraulic fluid under pressure supplied into the propeller hub 29 from a pressure source 31. A hydraulic valve operated by a solenoid 12 controls the supply of hydraulic fluid from the source into the hub of the propeller for the purpose of displacing the retaining means 28 thereby to break down the stop means 27.

A cam means 32 is carried by the root 25 of one of the blades 26 of the propeller 22. When the propeller 22 fines off on to its flight cruise stop, the cam means 32 closes a switch 10 mounted in the propeller hub. The cam 32 holds the switch 10 closed as long as the propeller 22 is at or below the flight cruise pitch.

In operation, when the solenoid 12 operates its valve fluid flows to the retaining means 28 moving it in the right-hand direction in the drawings so that it does not support the stop means 27. These may then break down, i.e., move to the inoperative position and the ram can move further in the pitch fining direction.

The four switches 10 are connected in series with one another and with a source of electric current 15 and also with a circuit 11 containing four solenoids 12 connected with one another in parallel. The solenoids 12, when energised by closure of all the switches 10, initiate breakdown of the flight stops in the manner described. The circuit 11 is also connected directly with the source 15 through a double pole manual switch 13 by closure of which the solenoids 12 can be energised at will.

An additional double pole manual switch 14 is provided in the circuit containing the switches 10 to isolate the circuit from the electrical source 15; such latter switch may be desirable to prevent the energisation of the solenoids due to electrical failure in the circuit containing the switches 10 and/or to place the breakdown of the stops entirely under the control of the pilot by closure of the switch 13.

I claim:

1. In a multi-engined aircraft the combination of a plurality of gas-turbine engines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop and each operable to move its pitch stop to the inoperative position, a plurality of detecting means one in operative connection with each of said propellers for detecting when said propeller has fined off to a predetermined amount, and control means in operative connection with all said detecting means and with all said stop withdrawal means and operable when all said detecting means have detected when said propellers have fined off to said predetermined amount to operate all said stop withdrawal means.

2. In a multi-engined aircraft the combination of a plurality of gas-turbine engines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop, each incorporating an electromagnetic means and being operable to move its pitch stop to the inoperative position when said electromagnetic means is energized, a plurality of propeller switch means one connected to each propeller to be closed when said propeller has fined off to a predetermined amount, a source of electrical power and an electric circuit across said source, said circuit comprising said propeller switches arranged in series with one another and with said electromagnetic means.

3. The combination of claim 2 wherein the electromagnetic means incorporates a solenoid.

4. The combination of claim 2 wherein said electromagnetic means are arranged in parallel with each other.

5. The combination of claim 2 further comprising manually operable isolating switch means in said circuit in series with all said electromagnetic means and said propeller switch means and operable to isolate said electromagnetic means from said source.

6. The combination of claim 2 further comprising manually operable overriding switch means in said circuit in series with all said electromagnetic means and in parallel with all said switch means and operable to connect said electromagnetic means with said electric source.

7. In a multi-engined aircraft the combination of a plurality of gas-turbine engines, a plurality of variable pitch propellers one driven by each engine, a plurality of constant speed units one connected to each propeller to control the speed thereof by pitch variation, a plurality of pitch stops one in each propeller and each movable between an operative position in which it sets a limit on the reduction of pitch of its propeller and an inoperative position, and a plurality of pitch stop withdrawal means one connected to each pitch stop, each incorporating an electromagnetic means and being operable to move its pitch stop to the inoperative position when said electromagnetic means is energized, a plurality of propeller switch means one connected to each propeller to be closed when said propeller has fined off to a predetermined amount, a source of electrical power, manually operable isolating switch means, manually operable overriding switch means and an electric circuit across said source, said circuit comprising said electromagnetic means connected in parallel with one another, said propeller switch means and said isolating switch means connected in series with one another and with said electromagnetic means, and said overriding switch means connected in series with said electromagnetic means and in parallel with said propeller switch means and said isolating switch means.

References Cited in the file of this patent

UNITED STATES PATENTS

| | | |
|---|---|---|
| 2,455,378 | McCoy | Dec. 7, 1948 |
| 2,593,910 | Morris et al. | Apr. 22, 1952 |
| 2,600,017 | Morris et al. | June 10, 1952 |
| 2,663,373 | Richmond | Dec. 22, 1953 |